UNITED STATES PATENT OFFICE.

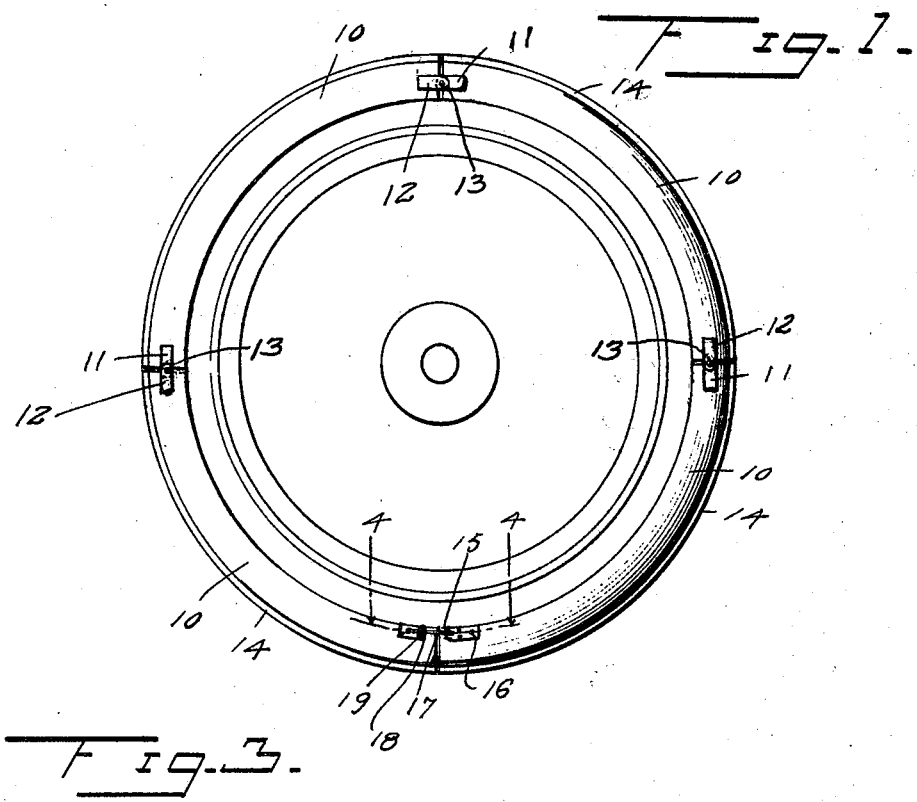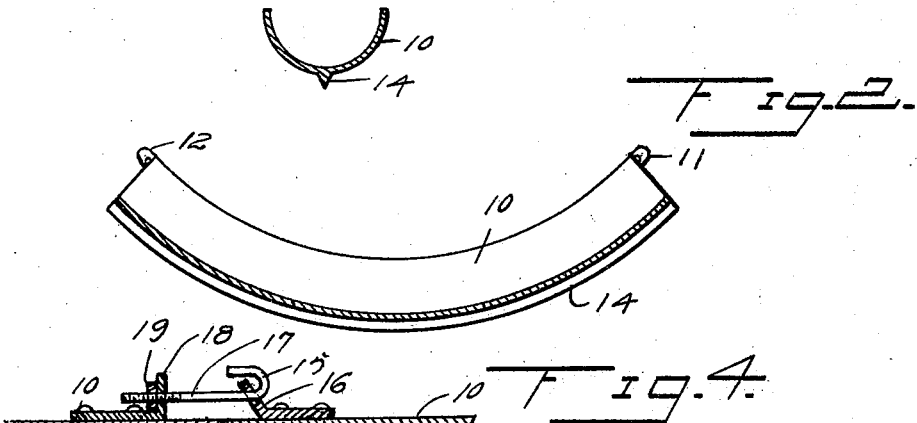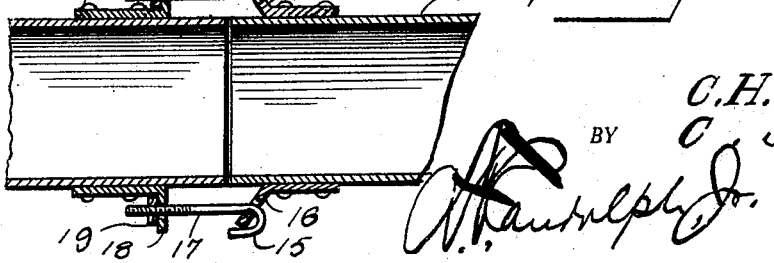

CLARENCE H. JONES AND CHARLES SCHULZ, OF HORDVILLE, NEBRASKA.

NONSKID TIRE.

1,412,006. Specification of Letters Patent. Patented Apr. 4, 1922.

Application filed August 24, 1920. Serial No. 405,630.

*To all whom it may concern:*

Be it known that we, CLARENCE H. JONES and CHARLES SCHULZ, citizens of the United States, residing at Hordville, in the county of Hamilton and State of Nebraska, have invented certain new and useful Improvements in a Nonskid Tire; and we do hereby declare the following to be a full, clear, and exact description of the invention, such as will enable others skilled in the art to which it appertains to make and use the same.

An object of the invention is to provide a readily attachable sectional metallic tire for use in connection with the wheels of automobiles and similar vehicles to protect the shoe or casing thereof and to prevent skidding of the same, and the special object in view is to provide a device for this purpose which can readily be applied to the wheel without involving the risk of injuring the usual casing employed in connection with pneumatic tires; and with this object in view the invention consists in a construction and combination of parts of which a preferred embodiment is shown in the drawing, wherein:

Figure 1 is a side view of a tire embodying the invention applied in the operative position to a wheel.

Figure 2 is a longitudinal sectional view of a portion of the shoe embodying the invention.

Figure 3 is a transverse section of the same.

Figure 4 is a detail view showing the connection between the free ends of the series of sections of which the shoe is formed to adapt it to be readily and compactly folded for transportation or storage when not in use.

The shoe which is preferably made of sheet metal consists of a plurality of sections 10 which are terminally connected for relative movement by means of the overlapping hinge members consisting of ears 11 and 12 riveted or otherwise substantially secured to the adjacent extremities of the sections and connected by the pivot 13. Each section is of substantially semi-circular contour cross sectionally and is provided at the center of its tread with a rib 14 serving to prevent side wise skidding or slipping, and the free ends of the terminal sections of the shoe are provided respectively with the fastening members consisting of the hook 15 and eye 16. The hook is preferably provided with a shank 17 engaging a perforated ear 18 and fitted with a nut 19 to permit of adjustment so that when the hook has been engaged with the eye 16 the adjustment of the nut will serve to tighten the shoe on the tire of the wheel to prevent any creeping or sliding movement thereon.

It is obvious that a device constructed as described can be manufactured at a small cost and when applied to the wheel will not only serve to increase the tractive effect thereof in traversing muddy or soft roads, but will prevent side skidding and slipping on ice or wet roads and thus will afford the driver and occupant of the car increased security.

Having thus described the invention, what we claim is:

A tire armor comprising a plurality of pivotally connected separable portions, lugs on the free ends of the terminal portions, said lugs being outwardly turned and perforated, a member passing through each pair of said outwardly turned lugs, each of said members having threads on one end and having the other end bent to form a hook, whereby a nut may be used on the threaded end to tension the arm with relation to the tire casing.

In testimony whereof we affix our signatures in presence of two witnesses.

CLARENCE H. JONES.
CHARLES SCHULZ.

Witnesses:
L. G. CROMPTON,
EDITH E. LINDAHL.